June 4, 1929.  F. W. BAKER  1,715,890
WHEEL RIM
Filed Feb. 1, 1926  3 Sheets-Sheet 1
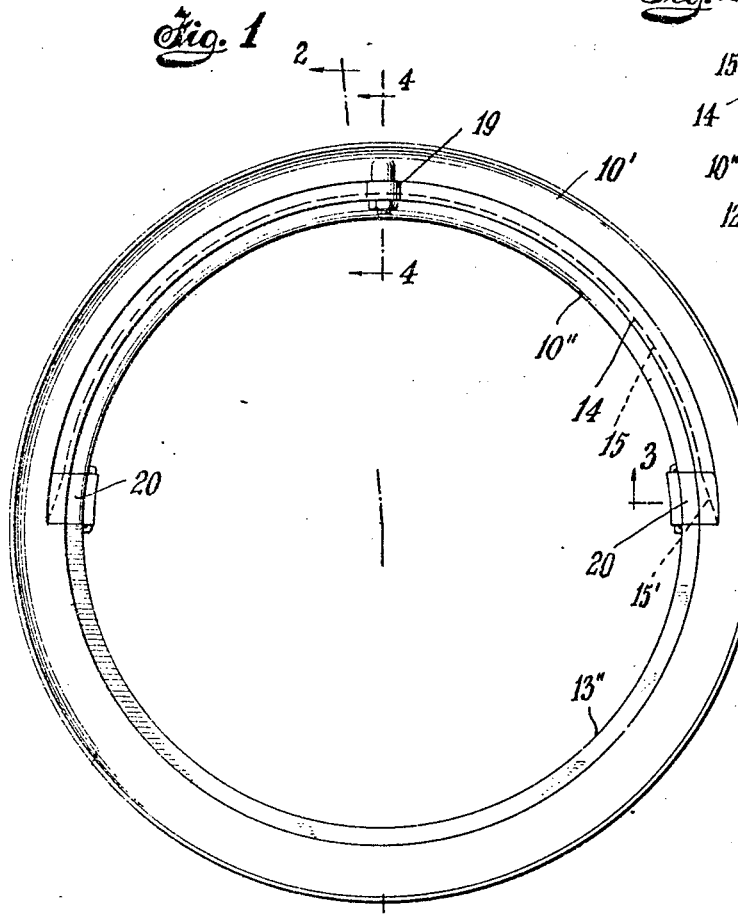
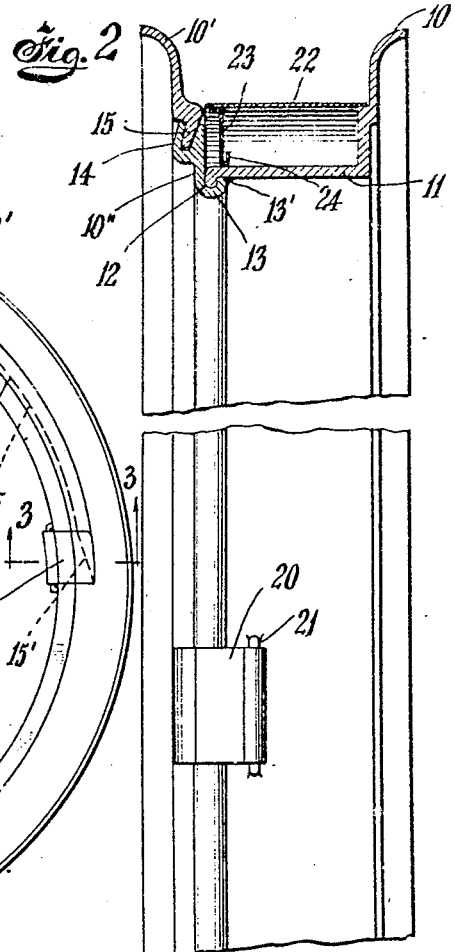
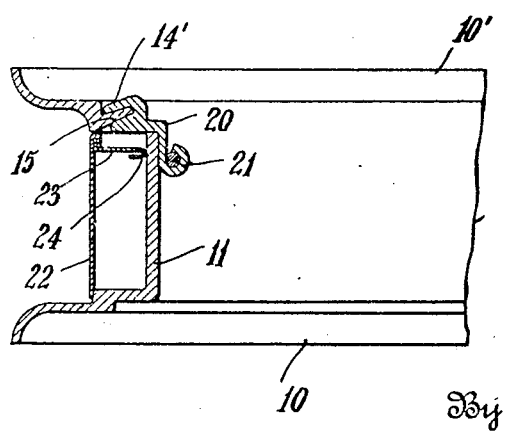
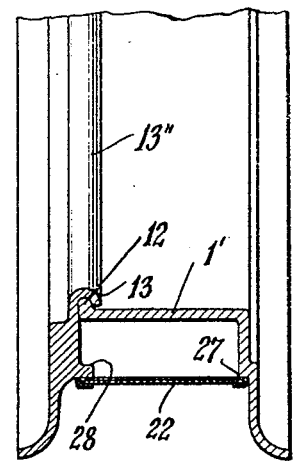
Inventor,
Frederick William Baker,
By his Attorney,
Ramsay Hoguet.

June 4, 1929. F. W. BAKER 1,715,890
WHEEL RIM
Filed Feb. 1, 1926 3 Sheets-Sheet 2
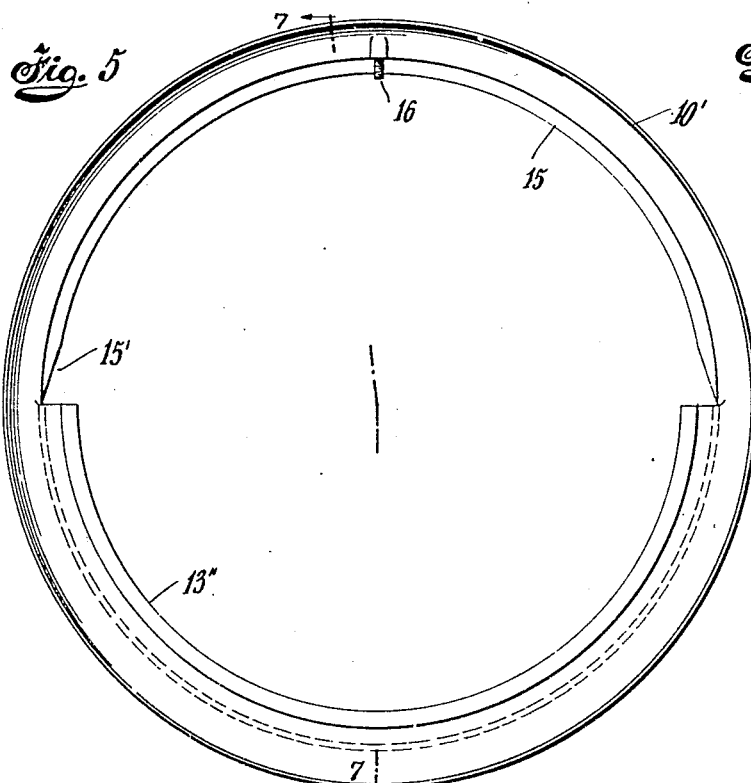
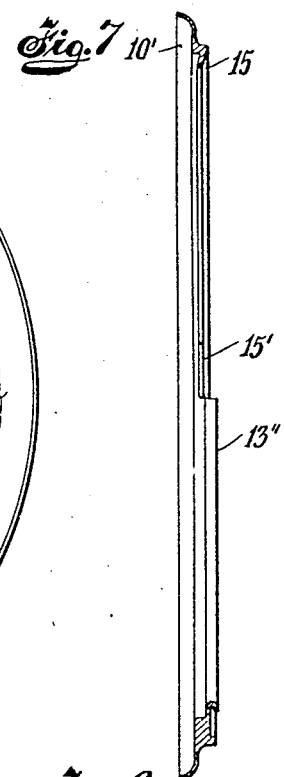
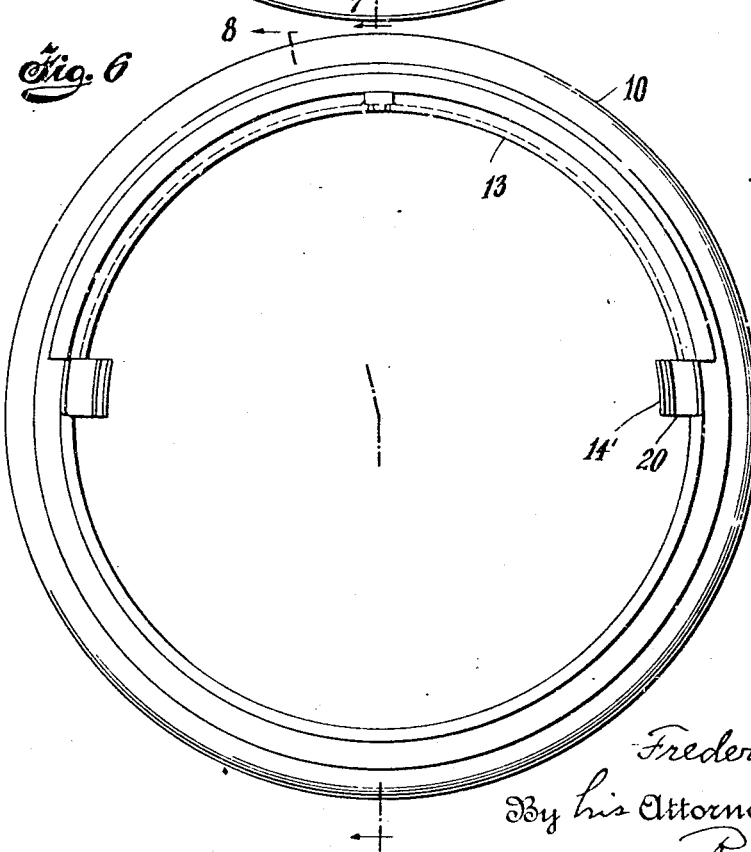
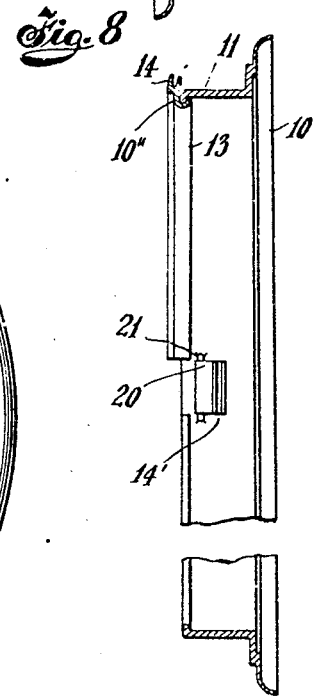
Inventor
Frederick William Baker,
By his Attorney,
Ramsay Hoguet.

June 4, 1929.　　　　F. W. BAKER　　　　1,715,890
WHEEL RIM
Filed Feb. 1, 1926　　　3 Sheets-Sheet 3
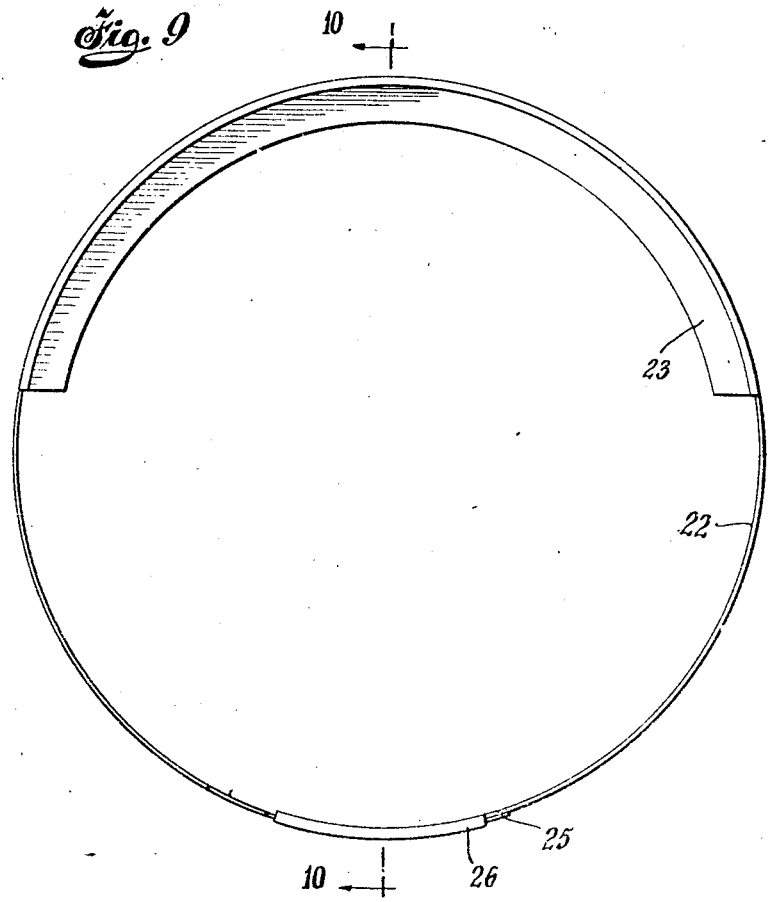
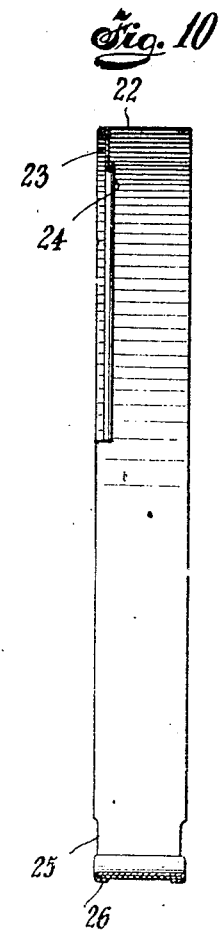
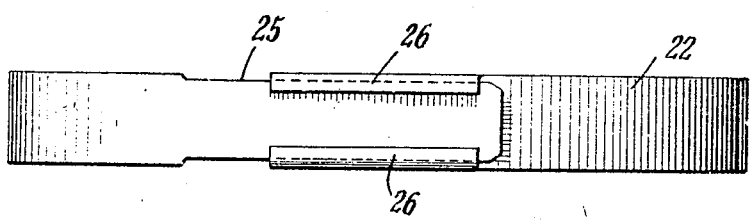
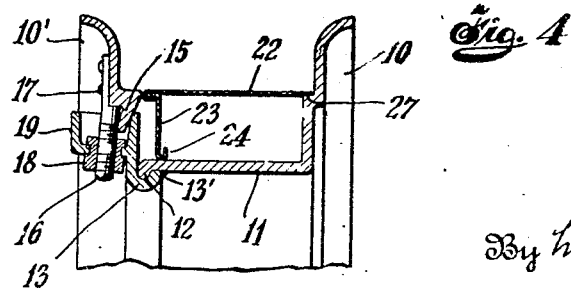
Inventor
Frederick William Baker,
By his Attorney.
Ramsay Hoguet Patented June 4, 1929.

1,715,890

UNITED STATES PATENT OFFICE.

FREDERICK WILLIAM BAKER, OF STOURBRIDGE, ENGLAND, ASSIGNOR TO TRINITY WHEEL CORPORATION, A CORPORATION OF NEW YORK.

WHEEL RIM.

Application filed February 1, 1926. Serial No. 85,262.

My invention relates to improvements in wheel rims and especially to such as have separable parts which render them demountable to the end that a tire or shoe carried by the rim can be easily removed or applied.

The object of my invention is generally to produce a simple, strong, easily operated demountable rim having continuous side flanges and having a connecting medium which will properly space the flanges with relation to each other and will permit them to be easily separated when desired.

My invention is further intended to produce a demountable rim in which the engaging parts are disposed in such way that they may be easily locked to prevent displacement and in which the complementary parts of the rim are separated by very slight sliding and lateral movement of one with relation to the other.

The invention is also adapted to be used in connection with a tire bed which lies between the spaced flanges which is adjustable in length and which is spaced apart from the connecting bracket of the flanges, this bed being adapted to conform in size to the inner periphery of the shoe or tire and serve the double purpose of affording a good bed and facilitating the removal of the tire.

The invention is also intended to provide engaging parts for the opposed members which are substantially in radial alinement to the end that the space between alined and engaging parts can be filled by a locking member to make the rim solid, which member can be released to permit a disengagement of the parts, all of which will more clearly appear from the following description.

Reference is had to the accompanying drawings in which similar reference characters refer to similar parts throughout the several views.

Figure 1 is a side elevation of the rim embodying my invention.

Figure 2 is a cross section on the line 2—2 of Figure 1.

Figure 3 is a broken cross section on the line 3—3 of Figure 1.

Figure 4 is a broken cross section on the line 4—4 of Figure 1.

Figure 5 is a detail side elevation of one rim member.

Figure 6 is a similar elevation to Figure 5, but showing the opposed rim member.

Figure 7 is a cross section on the line 7—7 of Figure 5.

Figure 8 is a cross section on the line 8—8 of Figure 6.

Figure 9 is a side elevation or edge view of the tire bed.

Figure 10 is a cross section on the line 10—10 of Figure 9.

Figure 11 is a face view of the tire bed showing the sliding connection of the end portion of Figure 10.

The rim is composed of two spaced side flanges 10—10', which can be shaped to fit a tire or shoe and each of which is preferably continuous so that it may be as strong as necessary. The flange 10 is provided with a spacing bracket 11 which is concentric with the tire bed. This is rigid on and may be integral with the flange 10 and it is preferred continuous having at its outer or free edge an inturned bead 12 adapted to engage a complementary groove member 13 which carries a segmental member 10'', this having at its outer periphery a socket 14. The socket 14 is adapted to receive the lip or extension 15 of the flange 10'. The member 13 referred to is made of the contour shown in Figure 2 as a matter of convenience and is rigidly secured as by spot welding to the bracket 11 as shown at 13'.

The member 14 and the bracket 11 might be of other kinds of shapes without affecting the invention, but the structure described and shown is desirable, particularly as the part 13 is adapted to aline with a corresponding member 13'' on the second flange 10' when the two flanges 10 and 10' are placed in position for use. Thus it will be seen that the member 13 extends around a segment only of the bracket 11, while the member 13'' on the second flange 10' is of similar or substantially similar extent.

The connection between the member 13'' and the bead 12 on the bracket 11 is however a sliding connection so that these parts may be readily disengaged. The lip or extension 15 on the inner part of the flange 10' is as shown in Figure 5, segmental extending approximately around one half of the flange and its end portions are thinned or tapered as at 15' to facilitate separation of the two parts of the rim.

It will be noticed from the foregoing description that the member 10' may be moved slightly with relation to the member 10 so as to slide the part 13″ over one portion of the bead 12, while at the same time the lip 15 on the opposite part of the flange 10′ will slide into engagement with the socket member 14. As a means of keeping these parts in proper relation, the structure shown in Figures 1 and 4 is used, although as will be presently seen, a sliding relation of these parts to each other is not dependent upon this locking means.

As illustrated in Figure 4, the member 10′ has a screw 16, the shank 17 of which is flattened and secured to the flange 10′. This screw is engaged by a nut 18 which is rotatably secured in an extension 19 on the side of the flange so that by rotating the nut the flange 10′ will be locked to the extension of the bracket 11 and by rotating it in the opposite direction the parts may be released.

It has been shown that as the parts 13 and 13″ are spaced apart when the complementary members of the rim are in opposed position, means is provided to fill this space to the end that the rim may be made substantially solid and to prevent the members 10 and 10′ from moving any way with relation to each other. To this end latches 20 are hinged on the inner wall of the bracket or extension 11 and provided at their free ends with socket members 14′ which coincide with the ends of the sockets 14, so as to receive the lip 15.

While the structure already described may be used as a rim I prefer to have the bracket 11 within and concentric with the bed 22 which serves to support a tire or shoe. This bed is preferably of sheet metal and is shown clearly in Figures 9 to 11. It has an inturned flange or extension 23 on one part, this being as shown in Figure 9, of segmental shape and having its inner end preferably thickened or turned over as at 24 so that when the bed is in place between the flanges 10 and 10′, it will be in spaced relation to the member 11 and the supporting web or flange 23 will rest against the member 11 for a part of the circumference of the bed. The other part of the bed lies upon the shoulders 27 and 28, see Figure 2, which are produced respectively on the flanges 10 and 10′.

The bed 22 is extensible and a simple way of providing for this function is to have one end portion of the bed slightly reduced in width as at 25 and with the reduced part sliding between keepers 26 on the opposite end portion of the bed. Thus it will be seen that the bed can be easily placed in position between the flanges 10 and 10′ and will afford a longitudinally extensible and contractable support for a shoe or tire so as to adapt itself to said parts and if the tire or shoe is to be removed the latches 20 are opened, the nut 18 unscrewed and the part 10′ moved eccentrically to the part 10 and then separated from it. Afterwards the tire and its bed can be easily removed and the bed can, if desired, be as easily removed from the tire or shoe.

From the foregoing description, it will be seen that the members 10 and 10′ can be connected together with the utmost ease and that they can be locked into position by simply swinging the latches 20 into place, the parts being further secured by a simple turning of the nut 18. It will also be seen that the parts may be easily separated and that nothing in the construction is likely to be broken or displaced, thus rendering the rim desirable for actual use.

I claim:

1. A wheel rim comprising a pair of flanges each having a segmental projecting portion and a segmental recessed portion, the segmental projecting portion of each flange being adapted to seat in the segmental recessed portion of the other, and a detachable bed positioned between the flanges, a portion of said bed resting directly on both flanges while another portion of said bed is provided with an inwardly extending web which rests on one flange.

2. A bed plate for placement between detachable rim flanges, comprising a circumferentially extending substantially flat body portion, having a segmental supporting web extending radially inward of the body portion.

3. A wheel rim comprising a pair of separable flanges, a bracket rigid on one of the flanges and segmentally connected to the second flange, and a tire bed having a continuous seat on one flange and near its opposite edge a segmental web disposed to seat on the aforesaid bracket.

4. A wheel rim having spaced separable flanges, a bracket rigid on one flange and having a segmental connection with the second flange, and an extensible and removable tire bed having one edge seated on the first flange and having a segmental web or support near its opposite edge adapted to rest upon the aforesaid bracket and to fill the space between the segmental connection of the bracket and the second flange.

In testimony whereof, I have signed my name to this specification this 28th day of January, 1926.

FREDERICK WILLIAM BAKER.